US005746914A

United States Patent [19]
Hanna et al.

[11] Patent Number: 5,746,914
[45] Date of Patent: May 5, 1998

[54] HONEY COMB FILTER ASSEMBLY AND METHOD OF MAKING THE SAME

[75] Inventors: Scott C. Hanna, Hudson; Kevin L. Burmeister, Uniontown, both of Ohio

[73] Assignee: Graphite Sales, Inc., Chagrin Falls, Ohio

[21] Appl. No.: 736,713

[22] Filed: Oct. 28, 1996

[51] Int. Cl.⁶ .................................................. B01D 27/02
[52] U.S. Cl. .................... 210/266; 210/279; 210/283; 210/288; 210/289; 210/290; 210/483; 210/488; 55/321; 55/322; 55/483; 55/DIG. 30; 29/896.6
[58] Field of Search ............................. 29/896.6, 896.62; 210/266, 279, 283, 288, 289, 290, 483, 488; 55/321, 322, 323, 324, 483, 484, 482, 518, 316, DIG. 5, DIG. 30, DIG. 31, DIG. 46

[56] References Cited

U.S. PATENT DOCUMENTS

| | | |
|---|---|---|
| 994,282 | 6/1911 | Spilbury . |
| 1,982,099 | 11/1934 | Hechenbleiner . |
| 2,658,583 | 11/1953 | Fitzgerald . |
| 3,124,440 | 3/1964 | Hogg . |
| 3,186,149 | 6/1965 | Ayers . |
| 4,506,625 | 3/1985 | Vohringer ................. 55/DIG. 46 |
| 4,693,048 | 9/1987 | Guetersloh ................ 55/DIG. 46 |

FOREIGN PATENT DOCUMENTS 18221  1/1987  Japan ................. 55/DIG. 46

*Primary Examiner*—W. L. Walker
*Attorney, Agent, or Firm*—Vickers, Daniels & Young

[57] ABSTRACT

A filter assembly for use in an air remediation system is provided. The filter assembly includes a first and second filter member, each of which has a plurality of openings to define a plurality of separate flow passages. A granular filter material layer is disposed between the first and second filter members. A frame structure containing each of the first and second filter members as well as the granular filter material forms the self contained filter assembly.

32 Claims, 3 Drawing Sheets

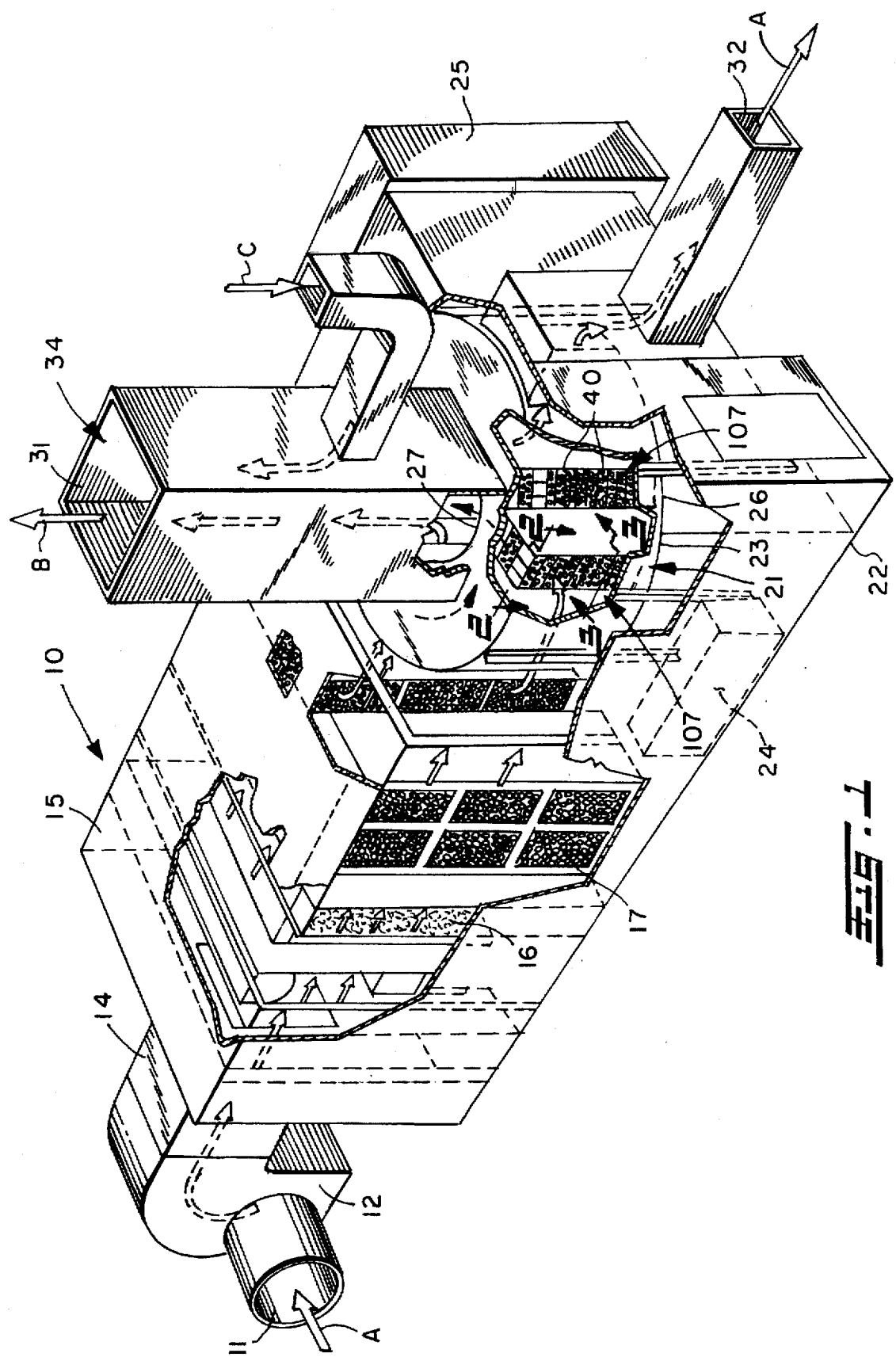

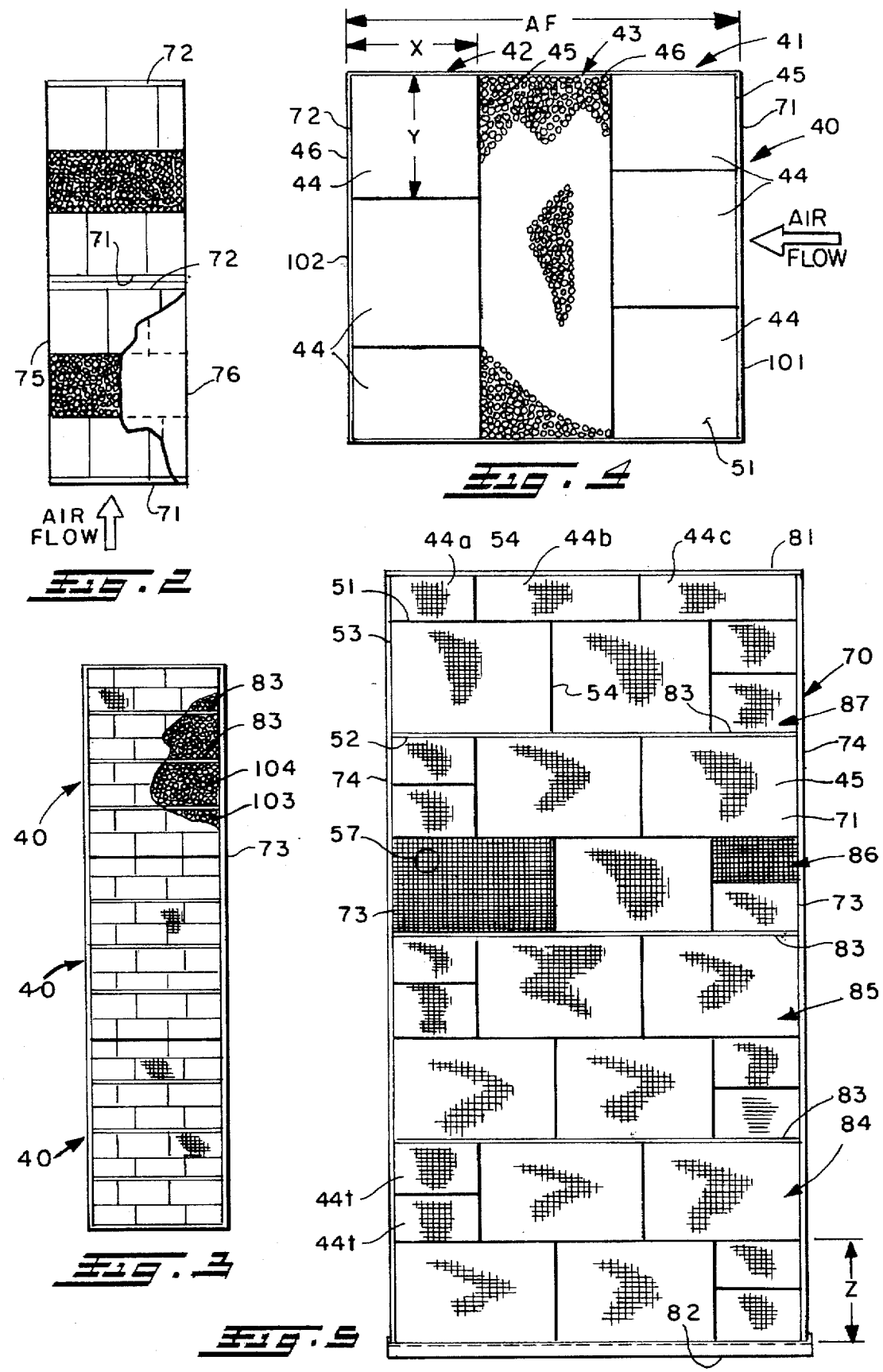

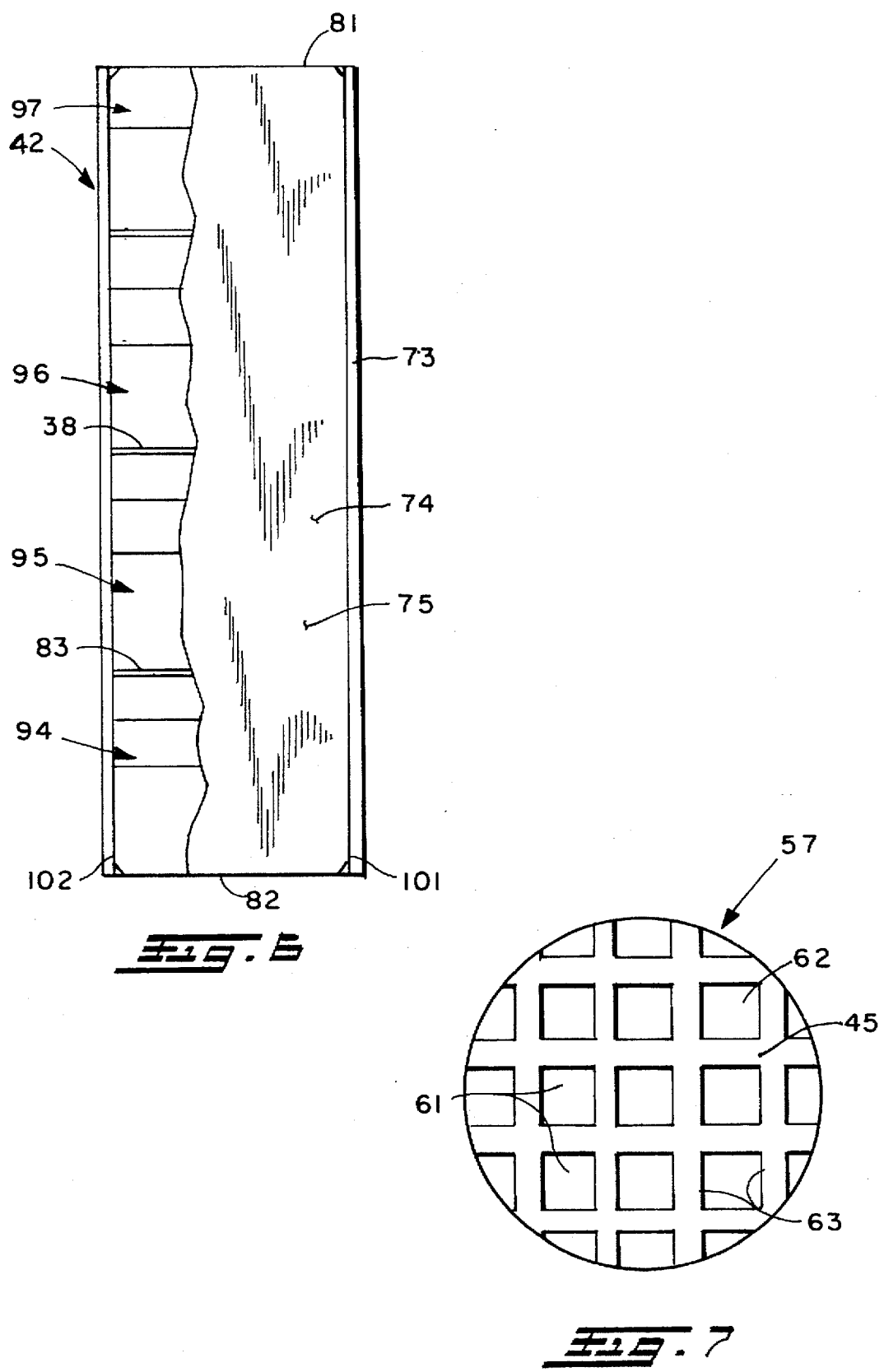

HONEY COMB FILTER ASSEMBLY AND METHOD OF MAKING THE SAME

The present invention relates to the art of carbon filter air cleaners and more particularly to an improved carbon honeycomb filter for use in solvent recovery systems. The invention will be described with particular reference thereto; however, it will be appreciated that the invention is applicable to other filter uses.

BACKGROUND OF THE INVENTION

As referred to herein, the term "honeycomb" filter refers to any filter or block material with air passages therethrough. The honeycomb can be of any polygonal shape in cross section. It is not limited to a hexagonal cross sectional shape. Activated carbon materials are used in a variety of pollution control applications. Pollutants in a gas or liquid stream are removed by contacting the stream with activated carbon which enables adsorption of the impurities out of the process streams.

As is well known, use of activated carbon in the form of pellets or powder is relatively common in many pollution control applications. However, activated carbon in this form is generally disadvantageous since it usually involves a high pressure drop between opposite sides of the carbon bed. Further, controlling a pressure drop across a bed of pellets or powder is generally more difficult. The pressure drop can widely vary depending on pellet or powder size and indeed, can change over time as beds of pellet or powder settle and become packed more tightly. Pellets or powder also result in entrainment of fine powder in the flow stream as the granules of activated carbon break down over time. Thus, honeycomb filters have become particularly advantageous in specific instances.

Honeycomb filters are also well known in the art. Some examples can be found in Gadkaree U.S. Pat. No. 5,510,063 and Toshikawa U.S. Pat. No. 3,922,412. These honeycomb filters or blocks, are usually extruded ceramic or other binder material. In the recent past, it has been known to coat the extrusion with an activated carbon or alternatively, an activated carbon mixed with the binder and then extruded to form a blended block. Activated carbon in the shape of a honeycomb has the advantage of high geometric surface area available for contact and low pressure drop across the filter surface. The polygonal geometry has the advantage of a large geometric surface area available for contact with the flow stream and low pressure drop across the filter surface. Such low pressure drop can reduce the size of the exhaust fan or blower required. Further, low pressure drops can increase the life expectancy of such mechanical systems. The low pressure drop in a honeycomb filter is due to the relatively linear path which the flow stream travels through the honeycomb filter. It is intended that the flow stream contact the inside surfaces of the honeycomb conduit. The honeycomb filter relies on air turbulence within the conduit and the length of the conduit through the filter to achieve desired removal efficiencies. In many instances, the cell density (i.e. the number of honeycomb conduits per unit area) must be increased to prevent unfiltered air from flowing through the filter. As expected, the requirement of an increased cell density also increases costs in the manufacturing and production of the honeycomb filter. Costs are especially important when it is realized that filters must be changed often in many applications since the advantages of low pressure drop are quickly negated as honeycomb conduits become dirty or clogged. Thus, honeycomb filters provide a distinct advantage over pelleted or powdered activated carbon but generally increase costs associated therewith. Further, in specific applications, honeycomb filters are the elements of choice, since the reduction of pressure loss across the filter is of prime importance. In such instances, the least expensive cost alternative is the use of honeycomb filters having the smallest cell density possible while still obtaining the desired removal efficiency. As the cell density increases, the cost of filters and replacement filters also increases.

SUMMARY OF THE INVENTION

The present invention advantageously provides a filter assembly which overcomes the disadvantages of prior art filters in that it uniquely provides a three layer filter element which strikes a balance between pressure loss and cleaning or removal efficiency while reducing overall costs.

More particularly in this respect, the invention can be used as a filter replacement element for air remediation systems, such as for paint laden air and the like. Air flow is directed to pass through a honeycomb block filter, which is comprised of an extruded material using an activated carbon within a binder. Secondly, air flow passes through a core of activated carbon pellets, and thirdly, out of the filter element through a second layer of honeycomb block. Thus, the air flow passes through the first layer of honeycomb block, through a core of pelleted activated carbon and out through a second layer of honeycomb block. The filter unit assemblies are placed in a frame structure having opening sections to allow air to pass through, while side walls are clad with an impervious sheathing to prevent air flow. The invention reduces costs while striking a balance between pressure loss and cleaning efficiency by utilizing a honeycomb structure having a small cell density on inlet and outlet ends of the filter unit. A small cell density honeycomb structure is less expensive than higher density structures, but is not necessarily effective to obtain optimum removal efficiencies. Thus, the void space within the filter unit between filter block layers is filled with a layer of pelleted activated carbon granules. The addition of the core of granules prevents air from passing straight through the filter element and instead forces the air to follow a tortuous path through the pelleted core.

In a preferred embodiment, the invention accomplishes the result of striking a balance between pressure loss and removal efficiency by utilizing a honeycomb structure having a cell density from 100 to 120 squares per inch. The invention also allows a honeycomb structure with the above described cell density, which is less expensive than higher density structures, to be effectively used and combined with a layer of granules or preferably pellets, which are large enough to reduce pressure drop across the filter. Thus, air flow through the filter is maintained while obtaining a removal efficiency in excess of a more expensive, high density honeycomb cell structure.

In accordance with one aspect of the present invention, the filter assembly comprises a first filter member having a plurality of openings therethrough to define a plurality of separate flow passages or conduits disposed in the direction of air flow, a second filter member having a plurality of openings therethrough to define a plurality of separate flow passages or conduits disposed in the direction of air flow, a granular filter material layer disposed between the first filter member and the second filter member, and a frame structure containing the first and second filter members and the granular filter material to form a self contained filter assembly. In the preferred embodiment, each of the filter members has no more than about 120 flow passages per square inch in cross section, and the granular filter material is a pelleted activated carbon, wherein at most, 5% of the granular filter material can screen through a #6 mesh screen (U.S.S.).

In accordance with another aspect of the invention, a filtering system for use in air remediation is provided. The system includes an inlet end for drawing solvent laden air therein, an exhaust end for expelling purified air, and ductwork enclosing the entire system therebetween. An exhaust fan is located adjacent the inlet end for drawing the solvent laden air therethrough. A cylindrical rotor unit is located adjacent the exhaust end, the rotor unit adapted to rotate during system operation. Located on the rotor unit is a plurality of the filter assemblies disposed along the periphery.

In a preferred embodiment, each filter assembly includes first and second rows of filter members, each of which comprises a portion of the first and second filter members, respectively. Each of the rows are stacked at least two filter blocks high. A granular material and preferably a pelleted activated carbon filter material is then placed in the void space between first and second rows. A singular spacer sheet is then placed across the first and second rows of filter blocks and across the void space with pelleted filter material therein. Third and fourth rows of filter blocks are then placed on the spacer sheet directly above the first and second rows, respectively. A second void space created by the third and fourth rows is then placed and preferably filled with the filter material. A second spacer sheet can then be placed across third and fourth rows of filter blocks and across the second void space. Subsequent rows and void spaces can be further placed until the filter assembly reaches the desired height. The spacer sheets provide good structural support for the frame structure of the filter assembly, but, more importantly, prevent dense packing and settling of the pelleted filter material in the void spaces. Since each void space acts independently, the weight of a long column of pelleted filter material associated with certain ineffective prior art filters is avoided. Thus, the pelleted filter material of the present invention is able to avoid dense packing and the widely varying flow rates therethrough, usually associated with prior art pelleted carbon filters.

It is thus an outstanding object of the present invention to provide an improved filter assembly for air remediation which strikes a balance between pressure loss and cleaning efficiency.

It is yet another object of the present invention to provide an improved filter assembly which utilizes a honeycomb filter structure which is less expensive than higher density structures, while delivering similar results in pressure loss and cleaning efficiency.

Still another object of the present invention is to provide an improved filter assembly in which optimum air flow through the filter is maintained while obtaining a removal efficiency in excess of more expensive, higher density honeycomb cell structures.

Yet another object of the present invention is to provide an improved filter assembly which provides the versatility to permit adaption to different pressure loss and removal efficiency requirements without changing the structure used.

A further object of the present invention is to provide an improved filter assembly which utilizes granular or pelleted filter material while reducing the adverse effects associated with packed beds of pellets or granules.

It is further another object of the present invention to provide an improved filter assembly which reduces entrainment of powder and attrition of the granules from the pelleted granules in the flow stream.

It is yet another object of the present invention to reduce the operation and maintenance costs associated with operating a filtering system.

Still yet another object of the present invention is to provide an improved method of making a filter assembly which results in a low pressure drop across the filter and a more stable bed of granular filter material.

These and other objects of the invention will become apparent to those skilled in the art upon reading and understanding the detailed description in the following section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 1 is a pictorial view, partially in section, illustrating the filtering system according to the present invention;

FIG. 2 is a plan view, partially in section, taken along line 2—2 of FIG. 1;

FIG. 3 is an elevation view, partially in section, taken along line 3—3 of FIG. 1;

FIG. 4 is a plan view of the filter assembly according to the present invention;

FIG. 5 is an elevation view of the filter assembly according to the present invention;

FIG. 6 is a side view, partially in section, of the filter assembly of FIG. 5; and, FIG. 7 is a detailed view of one aspect of the present invention.

THE PREFERRED EMBODIMENT

Referring to the drawings, wherein the showings are for the purpose of illustrating the preferred embodiment of the invention only and not for the purpose of limiting same, FIG. 1 shows an air remediation system 10 used specifically as a tool in paint booth applications wherein solvent laden exhaust air, represented by arrow A is drawn from a paint booth (not shown) into an inlet end 11 by a fan (not shown) within a fan enclosure 12. Solvent laden air A then is propelled through the ducts 14 and 15 as indicated by the arrows A. Located within duct 15 is a first prefilter 16 and a second prefilter 17 which are each adapted to remove any heavy particulate matter or impurities from exhaust air A. First and second prefilters 16 and 17 may be of any type known in the prior art.

From duct 15, exhaust air A travels to a cylindrical rotor unit 21. Rotor unit 21 is enclosed within a twelve foot by twelve foot box 22. The base 23 of rotor unit 21 is ten feet in diameter and driven by a rotor drive (not shown) within a rotor drive enclosure 24. A control panel 25 operates air remediation system 10 to activate and deactivate the fan within fan enclosure 12 and rotor drive within rotor drive enclosure 24 to rotate, in a counterclockwise fashion, rotor unit 21. Exhaust air A, upon exiting prefilters 16 and 17, flows from the exterior perimeter 26 of base 23 to the interior perimeter 27. In flowing from perimeter 26 to perimeter 27, air A is filtered so that air flowing at the interior perimeter 27 is purified exhaust air B. Purified exhaust air B exits system 10 through an exhaust end 31. It will be appreciated that unfiltered solvent laden exhaust air A, in relatively small quantities, is expelled out a desorption air outlet 32 in order to prevent back pressure from shutting down system 10. It will be further appreciated that hot air C is introduced through a desorption air inlet 33 and mixes with purified exhaust air B within an exhaust air chamber 34 to prevent a vacuum from forming within exhaust air chamber 34 which would ultimately reverse air flow within system 10.

To the extent described thus far, air remediation system 10 is within the scope of the prior art. The present invention fits into the rotor unit. Specifically, the air filter assemblies 40 are located within rotor unit 21. Each filter assembly 40, as shown in FIGS. 4 and 5, includes a first filter member 41, a second filter member 42 and a granular filter material 43 disposed therebetween. In the preferred embodiment, the filter material 43 is a pelleted activated carbon wherein at most 5% of the pelleted activated carbon can screen through a #6 mesh screen and has a sieve size in the range of about 6 mm diameter. Each of first filter member 41 and second filter member 42 is made up of a plurality of the individual premanufactured filter block elements 44. Each filter block 44 is what is commonly referred to as a honeycomb filter, an extruded material having some filtering properties and well known in the prior art. The term "honeycomb" as discussed herein refers to any polygonal shape and is not specifically limited to hexagonal cross sectional shapes. The filter blocks 44 used in the preferred embodiment contain an activated carbon within a binder. The block is extruded and baked to its final form. The preferred block 44 used is model TF-I and TF-II, manufactured by CATIC Bejing Company of Bejing, China. The TF-I block is 50 mm×50 mm×100 mm long, while the TF-II block is 100 mm×100 mm×100 mm long. The activated carbon gives a high adsorption capacity in comparison to many other honeycomb block materials. Each filter block 44 has an inlet open face 45 and an opposite outlet open face 46, which allows air to flow through filter block elements 44. It will be appreciated that each of the blocks is generally rectangular and thus includes top and bottom sides 51 and 52, respectively, as well as opposite lateral sides 53 and 54.

As best seen in FIG. 7, an area of detail 57, taken from FIG. 5, the interior of each filter block 44 contains a plurality of generally parallel flow passages 61 extending between inlet open face 45 and outlet open face 46. Each of flow passages 61 are polygonal in cross section and preferably square, as best seen by the individual openings 62 of flow passages 61 extending between inlet open face 45 and outlet open face 46. Each flow passage 61 is, in effect, an individual cell through which air passes. The interior walls 63 of flow passages 61 have an activated carbon content which adsorbs air impurities as air flow passes therethrough. In the preferred embodiment, the honeycomb structure utilized is generally square in cross section and has a cell density (defined by the number of cells in cross section per unit area) of no more than about 120 flow passages per square inch and preferably about 100 to 120 flow passages per square inch in cross section. Such cell density is much less expensive than higher density structures which can commonly exceed 400 cells per square inch. The cell density used also greatly reduces pressure loss between the inlet open face 45 and the outlet open face 46 of each of the filter blocks. Thus, fan capacity requirements are reduced in system 10, wear and tear on any fan use is minimized and the useful life of the fans or blowers is increased.

Filter blocks 44 are placed within a frame structure 70 to form first and second filter members 41 and 42. Frame structure 70 includes an inlet side 71 and outlet side 72 defined at opposite edges by the supporting frame members 73 which make up a portion of the skeletal structure of frame structure 70 to form a box-like structure. A stainless steel sheathing material 74 is clad on the opposite sides 75 and 76 of frame structure 70 and attached to frame members 73 by any known methods such as screws, tack welds or rivets. Stainless steel sheathing material 74 provides an air impervious barrier which allows air inflow between inlet side 71 and outlet side 72, as well as containing filter material 43 within structure 70. Frame structure 70 also includes an air impervious top surface sheathing 81 and a bottom surface sheathing 82 likewise attached to frame members 73, thus providing a self contained filter assembly.

In the preferred embodiment, inlet side 71 and outlet side 72 have dimensions which are approximately 9.2 inches wide and 31.4 inches high. The dimension between inlet side 71, shown as "AF" and outlet side 72 is approximately 10 inches, thus air flows through a path slightly greater than 10 inches. Air flows through a first filter member 41, in a relatively straight path, between inlet open face 45 and outlet open face 46. The air then follows a tortuous path through granular filter material 43 until entering inlet open face 45 of second filter member 42 where it again follows a straight path to outlet open face 46 of second filter member 42. As seen in FIGS. 1 and 2, air flow is likewise directed through the next filter assembly before being expelled as the purified exhaust air B.

Frame structure 70 also includes singular spacer sheets 83 which are generally parallel to top surface sheathing 81 and bottom surface sheathing 82. Spacer sheets 83 are placed interior of frame members 73 and span between inlet side 71 and outlet side 72 as well as opposite sides 75 and 76. As best seen in FIG. 5, filter blocks 44 are stacked in layers or tiers which are generally two filter blocks high. Each stacked layer of filter blocks 44, which is above, below or between a spacer sheet 83, as defined herein, comprises one row. With the exception of top rows, one row will generally be at least two filter blocks 44 high. Thus, first filter member 41 is comprised of a first row 84, a third row 85, a fifth row 86 and a top row 87. In a like manner, as seen in FIG. 6, second filter member 42 is comprised of a second row 94, a fourth row 95, a sixth row 96 and a top row 97. Each of the corresponding first and second, third and fourth, fifth and sixth and top rows are generally at the same elevation in both first filter member 41 and second filter member 42. Thus, singular spacer sheets 83 span across first row 84 and second row 94, third and fourth rows 85 and 95 and fifth and sixth rows 86 and 96.

Filter assembly 40 is constructed by providing frame structure 70, cladding opposite sides 75 and 76 with a stainless steel sheathing material 74 and providing filter blocks 44. In a preferred embodiment, each filter block is square and has dimensions of either 50 mm or 100 mm in dimensions "X," "Y" and "Z" is 100 mm. (Where necessary, TF-I blocks 44t, as defined above, are approximately 50 mm×50 mm×100 mm.) As can be best seen in FIG. 5, some filter blocks 44a, 44b and 44c must be cut to fit the outside dimensions of the frame. Filter blocks 44 are placed along front and back edges 101 and 102 of inlet side 71 and outlet side 72, respectively. A first row 84 is formed along front edge 101 by placing four filter blocks along front edge 101, two of TF-II filter blocks and two of TF-I blocks. A second set of filter blocks is stacked upon the first four in a like manner to form the first row 84. Similarly, filter blocks 44 are stacked along back edge 102 to form a second row 94. Thus, a void space 103 is formed between first row 84, second row 94 and bounded by opposite sides 75 and 76, which have been clad with sheathing material 74. Void space 103 is then placed with, and preferably filled with, pelleted activated carbon filter material 43. The singular spacer sheet 83 is then placed across first row 84 and second row 94, effectively covering void space 103.

A third and a fourth row 85 and 95, respectively, can then be stacked upon spacer sheet 83 in the same manner as first row 84 and second row 94. A second void space 104 is thus formed and filled with pelleted activated carbon. Another spacer sheet 83 is then placed thereacross. A fifth and a sixth row is then formed and a third void space 105 is filled with pelleted activated carbon. Thus far, it will be appreciated that as defined herein, each row is at least two filter blocks high. A final top row 87 and 97 of filter blocks 44 completes the inlet and outlet sides 71 and 72 of assembly 40. Each of top rows 87 and 97 include cut-to-fit blocks 44a, 44b and 44c. The compilation of rows 84, 85, 86 and 87 along inlet side 71 forms first filter member 41 as defined herein. Likewise, the compilation of rows 94, 95, 96 and 97 along outlet side 72 forms second filter member 42. In the preferred embodiment, top row 87 and top row 97 are stacked to the height of one and a half filter blocks with a second tier of blocks having been cut to fit within frame 70. It will be appreciated that the frame size requirements of air remediation system 10 will dictate the exact dimensions to which filter blocks 44 must be cut.

Thus formed, each of filter assemblies 40 are placed within the individual stations 107 of rotor unit 21. Each station 107 uses six total filter assemblies 40. As best seen in FIGS. 2 and 3, these filter assemblies 40 are stacked three high and two deep at individual stations 107 within rotor unit 21. As such, air flow is directed from exterior perimeter 26 to interior perimeter 27 through six individual filter assemblies 40, as shown in FIG. 2.

It will be appreciated that each of spacer sheets 83 provides better rigidity to filter assemblies 40 and frame structure 70, as well as preventing pelleted activated carbon filter material 43 from undesirably settling due to its own weight. Since filter material 43 is individually supported within each of void spaces 103, 104 and 105, air flow through filter material 43 remains more stable and is less likely to change over time due to the settling of the filter material 43.

The invention has been described with reference to the preferred embodiment. Obviously, modifications and alterations other than those discussed herein will occur to those skilled in the art upon reading and understanding the specification. It is intended to include all such modifications insofar as they come within the scope of the invention.

Having thus described the invention, it is claimed:

1. A filter assembly comprising: a first filter member having a plurality of openings therethrough to define a plurality of separate flow passages disposed in the direction of airflow, a second filter member having a plurality of openings therethrough to define a plurality of separate flow passages disposed in the direction of air flow, a filter material layer disposed between said first filter member and said second filter member, said first filter member and said second filter member including a plurality of adjacent honeycomb carbon blocks and a frame structure containing said first and said second filter members and said filter material layer to form a self contained filter assembly.

2. The filter assembly of claim 1, wherein said flow passages in said first and second filter members are arranged in a regular array.

3. The filter assembly of claim 2, wherein said flow passages are polygonal in cross section.

4. The filter assembly of claim 1, wherein in said first filter member there are no more than about 120 flow passages per square inch in cross section.

5. The filter assembly of claim 4, wherein in said first filter member there are about 100–120 flow passages per square inch in cross section.

6. The filter assembly of claim 4, wherein in said second filter member there are no more than about 120 flow passages per square inch in cross section.

7. The filter assembly of claim 6, wherein in said second filter member there are about 100–120 flow passages per square inch in cross section.

8. The filter assembly of claim 1, wherein said granular filter material is a pelleted activated carbon.

9. A filter assembly comprising: a first filter member having a plurality of openings therethrough to define a plurality of separate flow passages disposed in the direction of airflow, a second filter member having a plurality of openings therethrough to define a plurality of separate flow passages disposed in the direction of air flow, a filter material layer disposed between said first filter member and said second filter member, and a frame structure containing said first and said second filter members and said filter material layer to form a self contained filter assembly said filter material layer being a pelleted activated carbon granular filter material and at most 5% of said granular filter material can screen through a #6 mesh screen.

10. The filter assembly of claim 9, wherein said granular filter material has a sieve size in the range of about 6 mm diameter.

11. A filter assembly comprising: a first filter member having a plurality of openings therethrough to define a plurality of separate flow passages disposed in the direction of airflow, a second filter member having a plurality of openings therethrough to define a plurality of separate flow passages disposed in the direction of air flow, a filter material layer disposed between said first filter member and said second filter member which includes granular filter material and a frame structure containing said first and said second filter members and said filter material layer to form a self contained filter assembly and at most 5% of said granular filter material can screen through a #6 mesh screen.

12. The filter assembly of claim 1, wherein said first and second filter members are extrusions having an activated carbon.

13. A filter assembly comprising: a first filter member having a plurality of openings therethrough to define a plurality of separate flow passages disposed in the direction of airflow, a second filter member having a plurality of openings therethrough to define a plurality of separate flow passages disposed in the direction of air flow, a filter material layer disposed between said first filter member and said second filter member, and a frame structure containing said first and said second filter members and said filter material layer to form a self contained filter assembly said filter material layer having a width dimension in said direction of air flow, said width between 2 and 3 inches.

14. The filter assembly of claim 13, wherein said width is about 2 inches.

15. The filter assembly of claim 13, wherein at most 5% of said granular filter material can screen through a #6 mesh screen.

16. The filter assembly of claim 13, wherein said first and second filter members each have a filter member width dimension in said direction of air flow, each said filter member width being between 3 and 4 inches.

17. The filter assembly of claim 16, wherein each said filter member width is about 4 inches.

18. The filter assembly of claim 1, wherein said frame structure includes a skeletal structure of supporting frame members to form a box-like structure, a sheathing material cladding two sides of said frame structure, said two sides parallel to said direction of air flow.

19. A filtering system for use in air remediation, said system including an inlet end for drawing solvent laden air therein, an exhaust end for expelling purified air, said filtering system enclosed in a duct between said inlet and exhaust ends, an exhaust fan adjacent said inlet end for drawing said solvent laden air through said inlet end, a cylindrical rotor unit adjacent said exhaust end, said rotor unit including a plurality of filter assemblies disposed along the periphery of said rotor unit, each said filter assembly comprising a first filter member having a plurality of openings therethrough to define a plurality of separate flow passages disposed in the direction of air flow, a second filter member having a plurality of openings therethrough to define a plurality of separate flow passages disposed in the direction of air flow, a granular filter material layer disposed between said first filter member and said second filter member, and a frame structure containing said first and said second filter members and said granular filter material to form a self contained filter assembly.

20. The filtering system of claim 19, wherein said plurality of filter assemblies are arranged in sets on said rotor unit.

21. The filtering system of claim 20, wherein each said set includes at least three filter assemblies.

22. The filtering system of claim 21, wherein each said set includes six filter assemblies.

23. The filtering system of claim 20, wherein each said set includes said frame structures stacked three high and two deep in said rotor unit.

24. A method of constructing a filter assembly comprising the steps of:

providing a box-like frame structure;

cladding two of said four sides with an air impervious sheet material;

providing a plurality of premanufactured filter blocks having a plurality of separate flow passages disposed in a uniform direction therethrough and placing a first row of said filter blocks along one outer edge of said frame structure, said row extending between said clad sides;

placing a second row of said filter blocks along a second outer edge of said frame structure, said second row being opposite and generally parallel to said first row, arranging said filter blocks in order that said flow passages are parallel to said clad sides, said parallel rows and said clad sides forming a void space therebetween; and, placing a granular filter material within said void space.

25. The method of claim 24, including completely filling said void space with a granular filter material.

26. The method of claim 24, including providing a pelleted activated carbon as said granular filter material.

27. The method of claim 24, including the step of stacking each said first and second rows at least two filter blocks high.

28. The method of claim 27, including the intermediate step of placing said granular material within said void space immediately subsequent to said step of stacking said first and second rows at least two filter blocks high.

29. The method of claim 28, including providing and placing a singular spacer sheet across said first and said second rows.

30. The method of claim 24, including the steps of stacking said first and second rows two filter blocks high, placing said granular filter material in said void space, providing and placing a singular spacer sheet across said first and second rows to span said void spacing, placing third and fourth rows of filter blocks on said spacer sheet directly above said first and second rows respectively, and placing granular filter material on said spacer sheet in a second void space created by said third and fourth rows and said sheathed sides.

31. The method of claim 24, including cutting said filter blocks for fitting into said first and said second rows.

32. A filter assembly comprising: a first filter member having a plurality of openings therethrough to define a plurality of separate flow passages disposed in the direction of airflow, a second filter member having a plurality of openings therethrough to define a plurality of separate flow passages disposed in the direction of air flow, a filter material layer disposed between said first filter member and said second filter member, and a frame structure containing said first and said second filter members and said filter material layer to form a self contained filter assembly, said first filter member and said second filter member including honeycomb carbon block.

* * * * *